United States Patent
Singh et al.

(10) Patent No.: US 11,132,600 B2
(45) Date of Patent: Sep. 28, 2021

(54) METHOD AND DEVICE FOR NEURAL ARCHITECTURE SEARCH OPTIMIZED FOR BINARY NEURAL NETWORK

(71) Applicant: GIST(Gwangju Institute of Science and Technology), Gwangju (KR)

(72) Inventors: Kunal Pratap Singh, Udaipur (IN); Da Hyun Kim, Seoul (KR); Jong Hyun Choi, Gwangju (KR)

(73) Assignee: GIST(Gwangju Institute of Science and Technology), Gwangju (KR)

( * ) Notice: Subject to any disclaimer, the term of this patent is extended or adjusted under 35 U.S.C. 154(b) by 0 days.

(21) Appl. No.: 17/105,988

(22) Filed: Nov. 27, 2020

(65) Prior Publication Data

US 2021/0264240 A1 Aug. 26, 2021

(30) Foreign Application Priority Data

Feb. 21, 2020 (KR) .................. 10-2020-0021738

(51) Int. Cl.
*G06N 3/063* (2006.01)
*G06N 7/00* (2006.01)
(Continued)

(52) U.S. Cl.
CPC ........... *G06N 3/063* (2013.01); *G06N 3/0454* (2013.01); *G06N 3/084* (2013.01); *G06N 7/005* (2013.01)

(58) Field of Classification Search
CPC ...... G06N 3/063; G06N 3/0454; G06N 3/084; G06N 7/005
See application file for complete search history.

(56) References Cited

U.S. PATENT DOCUMENTS

2018/0336453 A1* 11/2018 Merity ................. G06N 3/0445
2019/0042911 A1* 2/2019 Koren .................... G06N 7/005
(Continued)

FOREIGN PATENT DOCUMENTS

JP 2018-190197 A 11/2018

OTHER PUBLICATIONS

Cai et al., "Proxylessnas: Direct Neural Architecture Search on Target Task and Hardware"), Feb. 23, 2019, arXiv:1812.00332v2, pp. 1-13. (Year: 2019).*
(Continued)

*Primary Examiner* — Kamran Afshar
*Assistant Examiner* — Ying Yu Chen
(74) *Attorney, Agent, or Firm* — Studebaker & Brackett PC

(57) ABSTRACT

A method for generating a target network by performing neural architecture search using optimized search space is provided. The method includes steps of: a computing device (a) if a target data is inputted into the target network, allowing the target network to apply neural network operation to the target data, to generate an estimated search vector; and (b) allowing a loss layer to calculate architecture parameter losses by referring to the estimated search vector and a ground truth search vector, and to perform backpropagation by referring to the architecture parameter losses to update architecture parameter vectors for determining final layer operations among candidate layer operations included in an optimized layer type set corresponding to the optimized search space and wherein the final layer operations are to be performed by neural blocks, within cells of the target network, arranged according to an optimized cell template corresponding to the optimized search space.

18 Claims, 4 Drawing Sheets

(51) Int. Cl.
   *G06N 3/04*       (2006.01)
   *G06N 3/08*       (2006.01)

(56)            References Cited

U.S. PATENT DOCUMENTS

2020/0097818 A1*  3/2020  Li .................... G06N 3/0481
2020/0410318 A1* 12/2020  del Mundo .......... G06N 3/0454

OTHER PUBLICATIONS

Gong et al., "Mixed Precision Neural Architecture Search for Energy Efficient Deep Learning", Nov. 4-7, 2019, 2019 IEEE/ACM International Conference on Computer-Aided Design (ICCAD). (Year: 2019).*
Choi et al. "Learning Architectures for Binary Networks", arXiv; published on Feb. 17, 2020.
Hanlin Chen et al. "Binarized Neural Architecture Search", arXiv; published on Feb. 11, 2020.
Mingzhu Shen et al. "Searching for Accurate Binary Neural Architectures", arXiv; published on Sep. 16, 2020.
Adrian Bulat et al. "BATS: Binary ArchitecTure Search", arXiv; published on Mar. 3, 2020.
Jiajun Du et al. "Network Search for Binary Networks", IEEE; published in Sep. 2019.
Office Action issued in KR 10-2020-0021738; mailed by the Korean Intellectual Property Office dated May 18, 2020.
Notice of Allowance issued in KR 10-2020-0021738; mailed by the Korean Intellectual Property Office dated Jul. 22, 2020.

* cited by examiner

METHOD AND DEVICE FOR NEURAL ARCHITECTURE SEARCH OPTIMIZED FOR BINARY NEURAL NETWORK

CROSS-REFERENCE TO RELATED APPLICATION

A claim for priority under 35 U.S.C. § 119 is made to Korean Patent Application No. 10-2020-0021738 filed on Feb. 21, 2020 in the Korean Intellectual Property Office, the entire contents of which are hereby incorporated by reference.

FIELD OF THE DISCLOSURE

The present disclosure relates to a method and a device for performing neural architecture search (NAS) for binary neural networks.

BACKGROUND OF THE DISCLOSURE

Automated machine learning (AutoML) and neural architecture search (NAS) are methodologies for automatically finding a neural network capable of performing a predetermined purpose. In the early days, a lot of research has been conducted on techniques in which an RNN (recurrent neural network) controller sequentially selects operations to be performed by each neural block, based mainly on reinforcement learning. However, a search based on the reinforcement learning takes a long time and requires too much computing resources. In order to solve this problem, a cell-based NAS for selecting an operation to be performed by each cell including a plurality of neural blocks, that is, for selecting an operation to be performed by each constituent unit of the neural network, has been proposed, but the problem still remains.

For another solution from a new perspective, a search procedure that is not based on the reinforcement learning has been proposed. Specifically, the reason a rather complicated algorithm such as the reinforcement learning is used for the search is because an optimization problem is set in a non-differentiable form. In other words, if the optimization problem can be set in a differentiable form, then it becomes possible to select the neural network using a simple gradient descent instead of using the complex reinforcement learning, thereby solving the above-described problem. Accordingly, unlike conventional searches based on the reinforcement learning in which non-differentiable validation accuracy is used as its objective function, newly proposed procedures may set a differentiable validation loss as its objective function to allow the objective function to be differentiable. As a result, it becomes possible to automatically create a neural network that has better performance than that of a neural network designed by humans much more efficiently than by using the conventional techniques.

On the other hand, as importance of mobile devices rises, importance of binary neural networks which require smaller computational load compared to existing floating point neural networks is increasing. However, the binary neural networks frequently show approximation errors or quantization errors, thus an architecture designed slightly different from that for the floating point neural networks is required. So far, studies have been focused on direct approximation of the floating point neural networks, but errors in the approximation decrease its efficiency. In addition, even if the above-described search procedure is to be applied, the NAS suitable for the binary neural networks is hard to find because most of the studies are focused on procedures optimized only for the floating point neural networks. That is, despite the necessity, a method for efficiently designing the binary neural networks has not been sufficiently studied.

SUMMARY OF THE DISCLOSURE

It is an object of the present disclosure to solve all the aforementioned problems.

It is another object of the present disclosure to generate a target network which is one of binary neural networks by performing neural architecture search (NAS) using optimized search space, i.e., the search space optimized for the binary neural networks.

It is still another object of the present disclosure to perform the NAS using an optimized layer type set which includes a zeroise layer, to thereby generate the target network with fewer flaws.

It is still yet another object of the present disclosure to generate architecture parameter losses using a diversity parameter, to thereby allow various layers to be selected in early stages of the NAS.

It is still yet another object of the present disclosure to reduce occurrence of a vanishing gradient problem during the NAS with introduction of inter-cell skip connection, to thereby allow the NAS to be more accurate.

In order to accomplish objects above and characteristic effects to be described later of the present disclosure, distinctive structures of the present disclosure are described as follows.

In accordance with one aspect of the present disclosure, there is provided a method for generating a target network which is one of binary neural networks by performing neural architecture search (NAS) using optimized search space optimized for the binary neural networks, including steps of: (a) a computing device, if at least one target data is inputted into the target network, performing a process of allowing the target network to apply at least one neural network operation to the target data, to thereby generate at least one estimated search vector; and (b) the computing device performing a process of allowing a loss layer to calculate one or more architecture parameter losses by referring to the estimated search vector and a GT (ground truth) search vector, and thus to perform backpropagation by referring to the architecture parameter losses, to thereby update one or more architecture parameter vectors to be used for determining each of final layer operations among candidate layer operations, wherein the candidate layer operations are included in an optimized layer type set corresponding to the optimized search space and wherein each of the final layer operations is to be performed by each of one or more neural blocks, within each of cells of the target network, arranged according to an optimized cell template corresponding to the optimized search space.

As one example, at the step of (b), the computing device performs a process of generating the architecture parameter losses by referring to at least one diversity parameter, the estimated search vector, and the GT search vector.

As one example, at the step of (b), the computing device performs a process of calculating the architecture parameter losses by using an equation below, and $$L(D; \theta, \alpha) = L_S(D; \theta, \alpha) - \lambda H(\alpha)e^{-\frac{t}{\tau}}$$

wherein θ represents one or more parameters of the target network, α represents the architecture parameter vectors, H represents entropy operation, t represents the number of times of epochs, τ represents a reinforcement hyperparameter, λ represents a scaling hyperparameter, $L_S(D; θ, α)$ represents one or more initial losses calculated by referring to the estimated search vector and the GT search vector, $$\lambda H(\alpha) e^{-\frac{t}{\tau}}$$

represents the diversity parameter, and L (D; θ, α) represents the architecture parameter losses.

As one example, the optimized layer type set includes (1) at least one target layer to be used for performing at least one target operation according to a purpose of the target network and (2) a zeroise layer to be used for generating an output whose components are all zeros irrespective of its input.

As one example, a specific architecture parameter vector, corresponding to a specific neural block, among the architecture parameter vectors is generated by using an equation below, and $$\left[\frac{\alpha_z}{\gamma}, \alpha_{op_1}, \ldots, \alpha_{op_n}\right]$$

wherein $\alpha_z$ represents an initial probability of a zeroise operation, corresponding to the zeroise layer, being selected as a specific final layer operation, among the final layer operations, of the specific neural block, γ represents a calibration hyperparameter to be used for calibrating the initial probability, $$\frac{\alpha_z}{\gamma}$$

represents a calibrated probability of the zeroise operation being selected as the specific final layer operation, and each of $\alpha_{op_1}$ to $\alpha_{op_n}$ represents each of probabilities of each of a first target operation to an n-th target operation corresponding to each of a first target layer to an n-th target layer being selected as the specific final layer operation.

As one example, the optimized cell template is acquired by setting connections among the neural blocks as having a shape of a directed acyclic graph (DAG) and wherein the connections include intra-cell skip-connection and inter-cell skip connection.

As one example, at the step of (a), if the target data is inputted into the target network, the computing device performs a process of allowing a specific neural block among the neural blocks within a specific cell of the target network to apply each of the candidate layer operations, corresponding to each element in the optimized layer type set, to an input transmitted from its previous neural block among the neural blocks, to thereby transmit a result of the candidate layer operations to its next neural block among the neural blocks.

As one example, at the step of (a), the computing device performs a process of generating a weighted sum of the result of the candidate layer operations by referring to its specific architecture parameter vector among the architecture parameter vectors.

As one example, the computing device performs a process of alternately inputting (1) a first target data to an n-th target data, one of which corresponds to the target data, in a target dataset and (2) a first temporary data to an n-th temporary data in a temporary dataset into the target network, to thereby alternately update (1) the architecture parameter vectors and (2) one or more temporary parameters to be used for performing each of the candidate layer operations of each of the neural blocks.

As one example, the method further comprises steps of: (c) the computing device, if each of the final layer operations to be performed by each of the neural blocks is determined by referring to the architecture parameter vectors, performing a process of allowing the target network to apply the neural network operation to at least one training data, to thereby generate at least one estimated training vector; and (d) the computing device performing a process of allowing the loss layer to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks.

In accordance with another aspect of the present disclosure, there is provided a method for testing a target network, which is one of binary neural networks, created by performing neural architecture search (NAS) using optimized search space optimized for the binary neural networks, including steps of: (a) a testing device, on condition that a learning device has performed, (1) if at least one target data is inputted into the target network, a process of allowing the target network to apply at least one neural network operation to the target data, to thereby generate at least one estimated search vector, (2) a process of allowing a loss layer to calculate one or more architecture parameter losses by referring to the estimated search vector and a GT (ground truth) search vector, and thus to perform backpropagation by referring to the architecture parameter losses, to thereby update one or more architecture parameter vectors to be used for determining each of final layer operations among candidate layer operations, wherein the candidate layer operations are included in an optimized layer type set corresponding to the optimized search space and wherein each of the final layer operations is to be performed by each of one or more neural blocks, within each of cells of the target network, arranged according to an optimized cell template corresponding to the optimized search space, (3) if each of the final layer operations to be performed by each of the neural blocks is determined by referring to the architecture parameter vectors, a process of allowing the target network to generate at least one estimated training vector by referring to at least one training data, and (4) a process of allowing the loss layer to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks, performing a process of allowing the target network to apply the neural network operation to at least one test data, to thereby generate at least one estimated test vector; and (b) the testing device performing a process of providing a user with a service for a purpose of the target network by referring to the estimated test vector.

In accordance with still another aspect of the present disclosure, there is provided a computing device for generating a target network which is one of binary neural networks by performing neural architecture search (NAS) using optimized search space optimized for the binary neural networks, including: at least one memory that stores instructions; and at least one processor configured to execute the instructions to perform: (I) if at least one target data is inputted into the target network, a process of allowing the target network to apply at least one neural network operation to the target data, to thereby generate at least one estimated search vector, and (II) a process of allowing a loss layer to calculate one or more architecture parameter losses by referring to the estimated search vector and a GT (ground truth) search vector, and thus to perform backpropagation by referring to the architecture parameter losses, to thereby update one or more architecture parameter vectors to be used for determining each of final layer operations among candidate layer operations, wherein the candidate layer operations are included in an optimized layer type set corresponding to the optimized search space and wherein each of the final layer operations is to be performed by each of one or more neural blocks, within each of cells of the target network, arranged according to an optimized cell template corresponding to the optimized search space.

As one example, at the process of (II), the processor performs a process of generating the architecture parameter losses by referring to at least one diversity parameter, the estimated search vector, and the GT search vector.

As one example, at the process of (II), the processor performs a process of calculating the architecture parameter losses by using an equation below, and $$L(D; \theta, \alpha) = L_S(D; \theta, \alpha) - \lambda H(\alpha)e^{-\frac{t}{\tau}}$$

wherein $\theta$ represents one or more parameters of the target network, $\alpha$ represents the architecture parameter vectors, H represents entropy operation, t represents the number of times of epochs, $\tau$ represents a reinforcement hyperparameter, $\lambda$ represents a scaling hyperparameter, $L_S(D; \theta, \alpha)$ represents one or more initial losses calculated by referring to the estimated search vector and the GT search vector, $$\lambda H(\alpha)e^{-\frac{t}{\tau}}$$

represents the diversity parameter, and $L(D; \theta, \alpha)$ represents the architecture parameter losses.

As one example, the optimized layer type set includes (1) at least one target layer to be used for performing at least one target operation according to a purpose of the target network and (2) a zeroise layer to be used for generating an output whose components are all zeros irrespective of its input.

As one example, a specific architecture parameter vector, corresponding to a specific neural block, among the architecture parameter vectors is generated by using an equation below, and $$\left[\frac{\alpha_z}{\gamma}, \alpha_{op_1}, \ldots, \alpha_{op_n}\right]$$

wherein $\alpha_z$ represents an initial probability of a zeroise operation, corresponding to the zeroise layer, being selected as a specific final layer operation, among the final layer operations, of the specific neural block, $\gamma$ represents a calibration hyperparameter to be used for calibrating the initial probability, $$\frac{\alpha_z}{\gamma}$$

represents a calibrated probability of the zeroise operation being selected as the specific final layer operation, and each of $\alpha_{op_1}$ to $\alpha_{op_n}$ represents each of probabilities of each of a first target operation to an n-th target operation corresponding to each of a first target layer to an n-th target layer being selected as the specific final layer operation.

As one example, the optimized cell template is acquired by setting connections among the neural blocks as having a shape of a directed acyclic graph (DAG) and wherein the connections include intra-cell skip-connection and inter-cell skip connection.

As one example, at the process of (I), if the target data is inputted into the target network, the processor performs a process of allowing a specific neural block among the neural blocks within a specific cell of the target network to apply each of the candidate layer operations, corresponding to each element in the optimized layer type set, to an input transmitted from its previous neural block among the neural blocks, to thereby transmit a result of the candidate layer operations to its next neural block among the neural blocks.

As one example, at the process of (I), the processor performs a process of generating a weighted sum of the result of the candidate layer operations by referring to its specific architecture parameter vector among the architecture parameter vectors.

As one example, the processor performs a process of alternately inputting (1) a first target data to an n-th target data, one of which corresponds to the target data, in a target dataset and (2) a first temporary data to an n-th temporary data in a temporary dataset into the target network, to thereby alternately update (1) the architecture parameter vectors and (2) one or more temporary parameters to be used for performing each of the candidate layer operations of each of the neural blocks.

As one example, the processor further performs: (III) if each of the final layer operations to be performed by each of the neural blocks is determined by referring to the architecture parameter vectors, a process of allowing the target network to apply the neural network operation to at least one training data, to thereby generate at least one estimated training vector, and (IV) a process of allowing the loss layer to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks.

In accordance with still yet another aspect of the present disclosure, there is provided a testing device for testing a target network, which is one of binary neural networks, created by performing neural architecture search (NAS) using optimized search space optimized for the binary neural networks, including: at least one memory that stores instructions; and at least one processor configured to execute the instructions to perform: (I) on condition that a learning device has performed, (1) if at least one target data is inputted into the target network, a process of allowing the target network to apply at least one neural network operation to the target data, to thereby generate at least one estimated search vector, (2) a process of allowing a loss layer to calculate one or more architecture parameter losses by referring to the estimated search vector and a GT (ground truth) search vector, and thus to perform backpropagation by referring to the architecture parameter losses, to thereby update one or more architecture parameter vectors to be used for determining each of final layer operations among candidate layer operations, wherein the candidate layer operations are included in an optimized layer type set corresponding to the optimized search space and wherein each of the final layer operations is to be performed by each of one or more neural blocks, within each of cells of the target network, arranged according to an optimized cell template corresponding to the optimized search space, (3) if each of the final layer operations to be performed by each of the neural blocks is determined by referring to the architecture parameter vectors, a process of allowing the target network to generate at least one estimated training vector by referring to at least one training data, and (4) a process of allowing the loss layer to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks, a process of allowing the target network to apply the neural network operation to at least one test data, to thereby generate at least one estimated test vector, and (II) a process of providing a user with a service for a purpose of the target network by referring to the estimated test vector.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
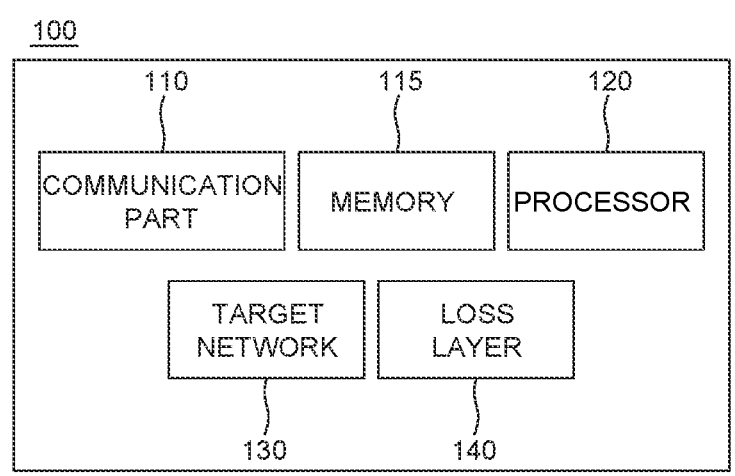
FIG. 1 is a drawing schematically illustrating a configuration of a computing device performing neural architecture search (NAS) for binary neural networks in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

To allow those skilled in the art to carry out the present disclosure easily, the example embodiments of the present disclosure will be explained in detail by referring to attached diagrams as shown below.

FIG. 1 is a drawing schematically illustrating a configuration of a computing device performing a method of performing neural architecture search (NAS) for binary neural networks in accordance with one example embodiment of the present disclosure.

By referring to FIG. 1, the computing device 100 may include a target network 130 and a loss layer 140. Herein, processes of inputs/outputs, and operations of the target network 130 and the loss layer 140 may be respectively performed by a communication part 110 and a processor 120. However, detailed connections between the communication part 110 and the processor 120 are omitted in FIG. 1. Herein, a memory 115 may already have stored instructions to be described later. And the processor 120 may be configured to perform the instructions stored in the memory 115, and may execute processes to be described later, to thereby perform the present disclosure. Such description of the computing device 100 does not exclude an integrated device including any combination of a processor, a memory, a medium, or any other computing components.

The configuration of the computing device 100 performing the neural architecture search (NAS) for the binary neural networks in accordance with one example embodiment of the present disclosure is described above. A method of performing the neural architecture search (NAS) for the binary neural networks is described in detail below by referring to FIG. 2.

Figure 2:
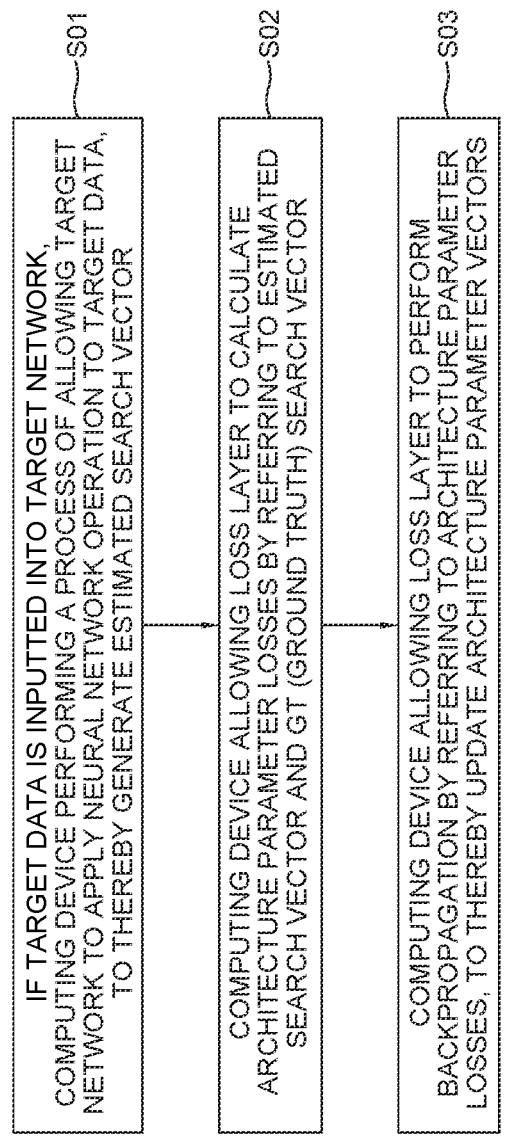
FIG. 2 is a flowchart schematically illustrating a method of performing the neural architecture search (NAS) for the binary neural networks in accordance with one example embodiment of the present disclosure.

FIG. 2 is a flowchart schematically illustrating a method of performing the neural architecture search (NAS) for the binary neural networks in accordance with one example embodiment of the present disclosure.

By referring to FIG. 2, if at least one target data is inputted into the target network 130, the computing device 100 may perform a process of allowing the target network 130 to apply at least one neural network operation to the target data, to thereby generate at least one estimated search vector, at a step of S01. Then, the computing device 100 may allow the loss layer 140 to calculate one or more architecture parameter losses by referring to the estimated search vector and a GT (ground truth) search vector, at a step of S02. And, the computing device 100 may allow the loss layer 140 to perform backpropagation by referring to the architecture parameter losses, to thereby update one or more architecture parameter vectors, at a step of S03. Each of the steps is described in detail below.

First, the target data to be inputted into the target network 130 may be selected according to a purpose of the target network 130. For example, if the purpose of the target network 130 is detection of one or more objects in one or more images, then the target data may be in a form of images. In this case, especially, the target data may be annotated training images commonly used for neural networks capable of detecting the objects. If the target data is inputted into the target network 130, the computing device 100 may perform a process of allowing the target network 130 to apply the neural network operation to the target data, to thereby generate the estimated search vector. As one example, at least one binarizing operation may be applied to the target data, and then the binarized target data may be inputted into the target network 130. The neural network operation applied at the current step may be performed by each of one or more neural blocks. Herein, one or more of the neural blocks may be arranged in each of cells of the target network 130 according to an optimized cell template corresponding to optimized search space, i.e., search space optimized for the binary neural networks. Also, the neural network operation applied at the current step may include each of candidate layer operations corresponding to each of elements in an optimized layer type set. Herein, the optimized layer type set may correspond to the optimized search space. This is explained by referring to FIG. 3.

Figure 3:
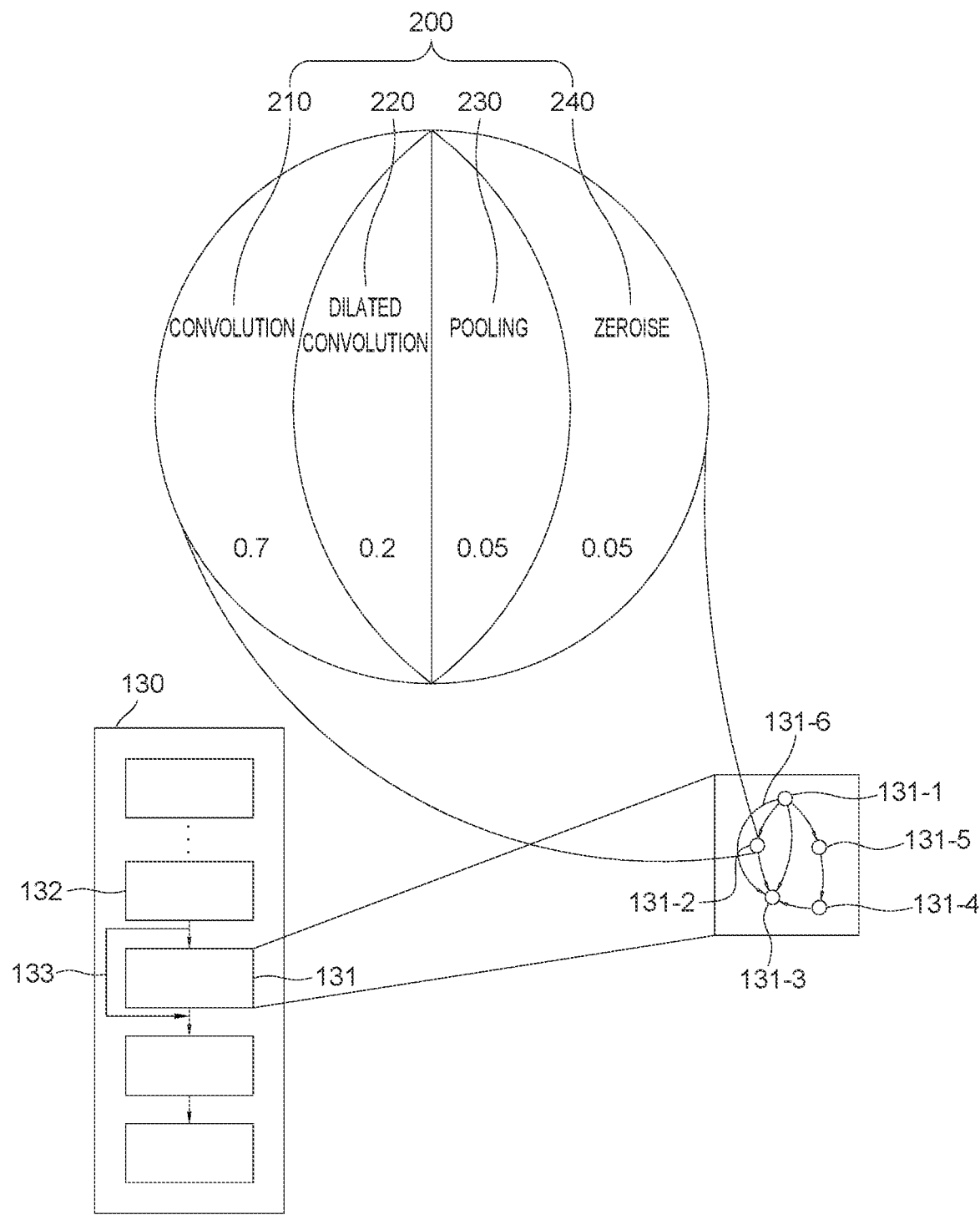
FIG. 3 is a drawing schematically illustrating an optimized cell template and an optimized layer type set to be used for a target network which is one of the binary neural networks in accordance with one example embodiment of the present disclosure.

FIG. 3 is a drawing schematically illustrating the optimized cell template and the optimized layer type set to be used for the target network in accordance with one example embodiment of the present disclosure.

By referring to FIG. 3, the target network 130 may be comprised of a plurality of the cells. Herein, a specific cell 131 is shown as configured according to the optimized cell template. The optimized cell template as such may be acquired by setting connections among the neural blocks 131-1 to 131-5 as having a shape of a directed acyclic graph (DAG) and the connections may include intra-cell skip-connection and inter-cell skip connection. Herein, skip-connection is connection from a previous layer to a next layer through addition, concatenation, etc., where the connection allows an output to be generated by coupling an input and its operation result, for a unit, e.g., a neural block or a cell, included in the neural network. In detail, the intra-cell skip-connection adds the skip-connection 131-6 among the neural blocks within the specific cell 131. And the inter-cell skip connection adds the skip-connection 133 between the specific cell 131 and another cell 132. Herein, skip-connections may be added among the neural blocks or among the cells, as the case may be. Conventional techniques only adopts the intra-cell skip-connection, and thus in this case, a vanishing gradient problem occurs when the NAS is applied to the binary neural networks. However, the present disclosure further adopts the inter-cell skip connection to prevent the vanishing gradient problem.

Each of the neural blocks connected as such may perform each of the candidate layer operations corresponding to each of the elements in the optimized layer type set 200 as shown in FIG. 3. Herein, the elements in the optimized layer type set 200 may include layers that the target network 130 may be comprised of. That is, the elements may include target layers, for example, a convolutional layer, a dilated convolutional layer, a pooling layer, or the zeroise layer, suitable for the purpose of the target network 130. The optimized layer type set 200 may include each of the layers as mentioned above for each size of their filters, that is, for example, the optimized layer type set 200 may include a 3×3 convolutional layer and a 5×5 convolutional layer, not a single convolutional layer. Each of the candidate layer operations may be each of operations that can be performed by each of the convolutional layer, the dilated convolutional layer, the pooling layer, and the zeroise layer, as mentioned above. Clearly, the scope of the present disclosure is not limited thereto, and the candidate layer operations may include other operations and the optimized layer type set 200 may include other layers. Herein, the zeroise layer is described for convenience of those skilled in the art.

The zeroise layer outputs all zeros irrespective of its input. Such a layer may seem useless, however, the zeroise layer may be useful in that it can be used for providing the NAS specialized for the binary neural networks in accordance with one example embodiment of the present disclosure. By referring to FIG. 4, one example is described.

Figure 4:
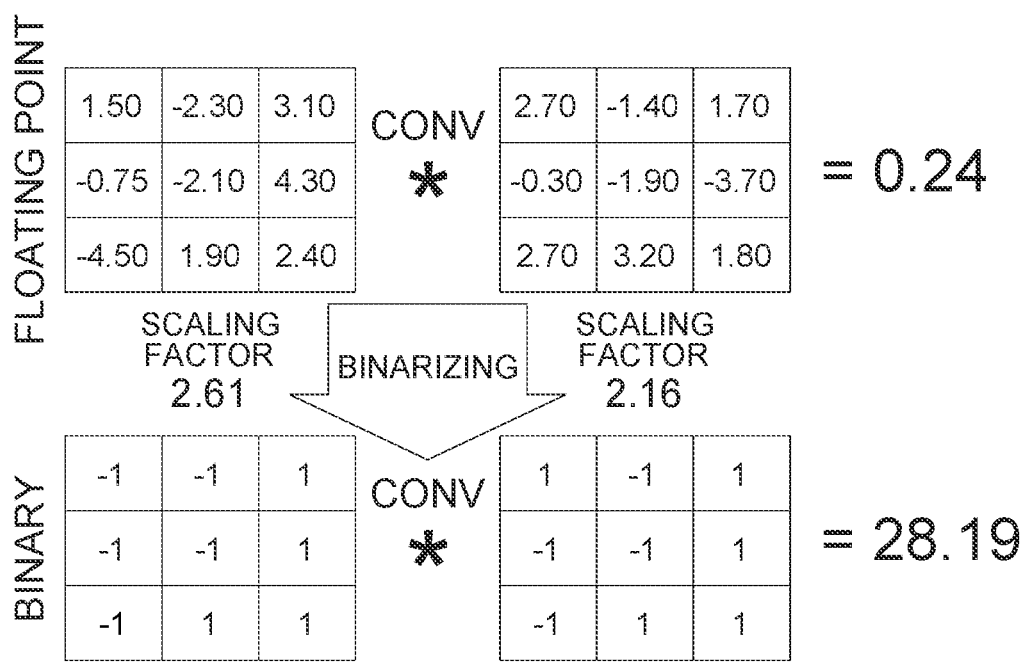
FIG. 4 is a drawing schematically illustrating a preferable example of performing the neural architecture search (NAS) for the binary neural networks by using a zeroise layer in accordance with one example embodiment of the present disclosure.

FIG. 4 is a drawing schematically illustrating a preferable example of performing the neural architecture search (NAS) for the binary neural networks process by using the zeroise layer in accordance with one example embodiment of the present disclosure.

By referring to FIG. 4, operands of a convolution operation of the floating point neural network are shown as small and close to zero, and a result of the convolution operation is shown as 0.24, also small and close to zero. However, a result of a binarized convolution operation is shown as 28.19, much different from the result of the floating point neural network. In such a case, errors may be reduced by using the zeroise layer. Since such cases occur frequently when the binary neural networks are used, the zeroise layer is included in the optimized layer type set 200 as one of candidate layers to be used for such cases. Although the conventional techniques may use the zeroise layer, its use is limited to a training or learning process or a search process. That is, the present disclosure selects the zeroise layer for use as a final layer, unlike the conventional techniques.

By referring to FIG. 3 again, the computing device 100 may allow each of the neural blocks to perform all of the candidate layer operations, i.e., the convolution operation, a dilated convolution operation, a pooling operation, and a zeroise operation, as part of the search process, i.e., the NAS. Specifically, the computing device 100 may perform a process of allowing the specific neural block 131-2 among the neural blocks 131-1 to 131-5 within the specific cell 131 to apply each of the candidate layer operations, corresponding to each of the elements 210 to 240 in the optimized layer type set 200, to an input transmitted from its previous neural block 131-1, to thereby transmit an output to its next neural block 131-3. Herein, the output may be a weighted sum of a result of the candidate layer operations, where the weighted sum is created by referring to a specific architecture parameter vector. By referring to FIG. 3, the specific architecture parameter vector (0.7, 0.2, 0.05, 0.05) corresponding to the specific neural block 131-2 is shown. In this case, a specific final layer operation of the specific neural block 131-2 may be determined as the convolution operation.

Herein, a calibration process for the specific architecture parameter vector to tune a probability of including the zeroise layer is described. That is, the specific architecture parameter vector, corresponding to the specific neural block 131-2, among the architecture parameter vectors may be generated by using an equation below.

$$\left[\frac{\alpha_z}{\gamma}, \alpha_{op_1}, \ldots, \alpha_{op_n}\right]$$

Herein, $\alpha_z$ may represent an initial probability of the zeroise operation, corresponding to the zeroise layer, being selected as the specific final layer operation, among the final layer operations, of the specific neural block 131-2, γ may represent a calibration hyperparameter to be used for calibrating the initial probability, $$\frac{\alpha_z}{\gamma}$$

may represent a calibrated probability of the zeroise operation being selected as the specific final layer operation, and each of $\alpha_{op_1}$ to $a_{op_n}$ may represent each of probabilities of each of a first target operation to an n-th target operation corresponding to each of a first target layer to an n-th target layer being selected as the specific final layer operation. The calibration process as such is an adjustment process by a user to prevent the zeroise layer from being selected too excessively. Apparently, the calibration process may be omitted as the case may be.

Then, the computing device 100 may allow the loss layer 140 to calculate the architecture parameter losses by referring to the estimated search vector and the GT search vector. Herein, if the architecture parameter losses are calculated by referring only to the estimated search vector and the GT search vector, then the layers with learnable parameters, e.g., the convolutional layer or the dilated convolutional layer, may not be selected as often in the early stages of the NAS, and instead, the layers requiring no learning such as the pooling layer or the zeroise layer may be selected more often. The architecture parameter losses may be calculated by further using at least one diversity parameter for calibration as below.

That is, the computing device 100 may perform a process of calculating the architecture parameter losses by using an equation below.

$$L(D; \theta, \alpha) = L_S(D; \theta, \alpha) - \lambda H(\alpha)e^{-\frac{t}{\tau}}$$

Herein, θ may represent one or more parameters of the target network 130, α may represent the architecture parameter vectors, H may represent entropy operation, t may represent the number of times of epochs, τ may represent a reinforcement hyperparameter, λ may represent a scaling hyperparameter, $L_S(D; \theta, \alpha)$ may represent one or more initial losses calculated by referring to the estimated search vector and the GT search vector, $$\lambda H(\alpha)e^{-\frac{t}{\tau}}$$

may represent the diversity parameter, and $L(D; \theta, \alpha)$ may represent the architecture parameter losses.

In the above equation, the initial losses are calculated as mentioned above by referring only to the estimated search vector and the GT search vector, where the architecture parameter losses may be calculated by using the diversity parameter for the calibration of the initial losses. As can be seen in the equation, the diversity parameter represents an entropy, i.e., a distribution, of the architecture parameters, thus the selection of the layers may be calibrated. Also, an effect of the diversity parameter is large in the early stages of the search process and becomes smaller in later stages of the search process due to the exponential term $$e^{-\frac{t}{\tau}}.$$

The diversity parameter is designed as such in order to compensate for a bias in the selection of some of the layers at the early stages of the search process, as described above. By using the diversity parameter, the layers with the learnable parameters may be selected as much at the early stages of the search process.

In one example embodiment, the search process may be performed along with a temporary training process of the target network. This is because, in case only the search process is performed, one or more temporary parameters required for performing the candidate layer operations may not be updated properly, resulting in somewhat distorted results. Therefore, the computing device 100 may alternately input a target dataset and a temporary dataset into the target network 130, to thereby alternately perform the search process and a learning process of the temporary parameters. Herein, the temporary dataset may be used for the search process or a pre-training process of the target network 130. Specifically, the computing device 100 may perform a process of alternately inputting (1) a first target data to an n-th target data, one of which corresponds to the target data, in the target dataset and (2) a first temporary data to an n-th temporary data in the temporary dataset into the target network 130, to thereby alternately update (1) the architecture parameter vectors and (2) the temporary parameters to be used for performing each of the candidate layer operations of each of the neural blocks.

As a result of the processes above, if the architecture parameter vectors are updated and if each of the final layer operations to be performed by each of the neural blocks is determined by referring to the architecture parameter vectors, then the computing device 100 may perform a process of allowing the target network 130 to apply the neural network operation to at least one training data, to thereby generate at least one estimated training vector. And the computing device 100 may perform a process of allowing the loss layer 140 to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks. These processes may be training processes to be used for actual use, i.e., to be used for testing, after the search process, not a temporary training or pre-training for the search process.

After the training processes as such are completed, the target network 130 may be tested, that is, used for its purpose. In detail, on condition that a learning device (not illustrated) has performed, (1-1) if the target data is inputted into the target network 130, a process of allowing the target network 130 to apply the neural network operation to the target data, to thereby generate the estimated search vector, (1-2) a process of allowing the loss layer 140 to calculate the architecture parameter losses by referring to the estimated search vector and the GT search vector, and thus to perform the backpropagation by referring to the architecture parameter losses, to thereby update the architecture parameter vectors to be used for determining each of the final layer operations among the candidate layer operations, where the candidate layer operations are included in the optimized layer type set 200 corresponding to the optimized search space and where each of the final layer operations is to be performed by each of the neural blocks, within each of the cells of the target network 130, arranged according to the optimized cell template corresponding to the optimized search space, (1-3) if each of the final layer operations to be performed by each of the neural blocks is determined by referring to the architecture parameter vectors, a process of allowing the target network 130 to generate the estimated training vector by referring to the training data, and (1-4) a process of allowing the loss layer 140 to calculate the operation parameter losses by referring to the estimated training vector and the GT training vector and to perform the backpropagation by referring to the operation parameter losses, to thereby learn at least part of the operation parameters to be used for performing each of the final layer operations of each of the neural blocks, a testing device (not illustrated) may perform a process of allowing the target network 130 to apply the neural network operation to at least one test data, to thereby generate at least one estimated test vector. As one example, the binarizing operation may be applied to the test data and then the neural network operation may be applied to the binarized test data.

Then, the testing device may perform a process of providing the user with a service for the purpose of the target network 130 by referring to the estimated test vector. For example, if the target network 130 is designed for the purpose of detecting one or more objects on one or more images as mentioned above, the estimated test vector may include information on the objects on the test data in a form of images, and the testing device may provide the user with the required service by referring to the estimated test vector.

Experiment results of comparing the binary neural networks generated in accordance with one example embodiment of the present disclosure and those generated by the conventional techniques are described below.

The table 1 shows comparison of a test accuracy between (1) the binary neural networks such as CBNAS-Mini, CBNAS-A, CBNAS-B and CBNAS-C created by using the method of the present disclosure and (2) the binary neural networks created by applying the binarizing operation such as XNOR-NET, PCNN, BinaryNet, etc. to the existing floating point neural networks. As can be seen in the table 1, CBNAS-Mini, CBNAS-A, CBNAS-B and CBNAS-C in accordance with one example embodiment of the present disclosure show the best performance among the binary neural networks with similar FLOPs. Also, it is also shown that CBNAS-C exhibits performance approaching that of ResNet18 which is a floating point neural network.

TABLE 1

| FLOPs (×10$^8$) | Model (Backbone) | Binarization | Test Acc (%) |
|---|---|---|---|
| ~0.04 | PCNN (i = 16) (WRN22) | Projection | 89.16 |
| | CBNAS-Mini | Sign + Scale | 90.12 |
| ~0.16 | XNOR-Net (ResNet18) | Sign + Scale | 88.82 |
| | XNOR-Net (DenseNet) | Sign + Scale | 85.16 |
| | XNOR-Net (NiN) | Sign + Scale | 86.28 |
| | XNOR-Net (SENet) | Sign + Scale | 88.12 |
| | BinaryNet (ResNet18) | Sign | 89.95 |
| | CBNAS-A | Sign + Scale | 92.70 |
| ~0.27 | XNOR-Net (ResNet34) | Sign + Scale | 88.54 |
| | XNOR-Net (WRN40) | Sign + Scale | 91.58 |
| | PCNN (i = 64) (WRN22) | Projection | 94.31 |
| | CBNAS-B | Sign + Scale | 93.76 |

TABLE 1-continued

| FLOPs (×10$^8$) | Model (Backbone) | Binarization | Test Acc (%) |
|---|---|---|---|
| ~0.00 | XNOR-Net (ResNext29-64) | Sign + Scale | 84.27 |
| | CBNAS-C | Sign + Seale | 94.43 |
| ~1.41 | ResNet18 (FP) | N/A | 94.73 |

The comparison results between a case with unique characteristics of the present disclosure, such as the zeroise layer, the inter-cell skip connection, and the diversity parameter and a case without the zeroise layer, the inter-cell skip connection, and the diversity parameter are described below to show effects of the configuration in accordance with one example embodiment of the present disclosure.

The table 2 shows the test accuracy of CBNAS-A, CBNAS-B and CBNAS-C in case the inter-cell skip-connection, the zeroise layer and the diversity parameter are used and in case each of the inter-cell skip-connection, the zeroise layer and the diversity parameter in turn is not used. As can be seen in the table 2, use of the inter-cell skip-connection, the zeroise layer and the diversity parameter shows significant enhancement in the test accuracy.

TABLE 2

| Model | Full | No Skip | No Zeroise | No Div |
|---|---|---|---|---|
| CBNAS-A | 92.70 | 61.23 | 89.47 | 90.95 |
| CBNAS-B | 93.76 | 67.15 | 91.69 | 91.55 |
| CBNAS-C | 94.43 | 70.58 | 88.74 | 92.66 |

Except the inter-cell skip-connection, the zeroise layer and the diversity parameter, those skilled in the art may refer to "DARTS: DIFFERENTIABLE ARCHITECTURE SEARCH" of Liu et al. for the configuration above. However, this dissertation on DARTS is based on an assumption that it is to be applied to the floating point neural networks, unlike the present disclosure based on an assumption that the present disclosure is to be applied to the binary neural networks.

The present disclosure has an effect of generating the target network which is one of the binary neural networks by performing the NAS using the optimized search space optimized for the binary neural networks.

The present disclosure has another effect of performing the NAS using the optimized layer type set which includes the zeroise layer, to thereby generate the target network with fewer flaws.

The present disclosure has still another effect of generating the architecture parameter losses using the diversity parameter, to thereby allow various layers to be selected in the early stages of the NAS.

The present disclosure has still yet another effect of reducing occurrence of the vanishing gradient problem during the NAS with introduction of the inter-cell skip connection, to thereby allow the NAS to be more accurate.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the spirit of the present disclosure must not be confined to the explained embodiments, and the following patent claims as well as everything including variations equal or equivalent to the patent claims pertain to the category of the spirit of the present disclosure.

What is claimed is:

1. A method for generating a target network which is one of binary neural networks by performing neural architecture search (NAS) using optimized search space optimized for the binary neural networks, comprising steps of:
   (a) a computing device, if at least one target data is inputted into the target network, performing a process of allowing the target network to apply at least one neural network operation to the target data, to thereby generate at least one estimated search vector; and
   (b) the computing device performing a process of allowing a loss layer to calculate one or more architecture parameter losses by referring to the estimated search vector and a GT (ground truth) search vector, and thus to perform backpropagation by referring to the architecture parameter losses, to thereby update one or more architecture parameter vectors to be used for determining each of final layer operations among candidate layer operations, wherein the candidate layer operations are included in an optimized layer type set corresponding to the optimized search space and wherein each of the final layer operations is to be performed by each of one or more neural blocks, within each of cells of the target network, arranged according to an optimized cell template corresponding to the optimized search space,
   wherein, at the step of (b), the computing device performs a process of generating the architecture parameter losses by referring to at least one diversity parameter, the estimated search vector, and the GT search vector.

2. The method of claim 1, wherein, at the step of (b), the computing device performs a process of calculating the architecture parameter losses by using an equation below, and $$L(D; \theta, \alpha) = L_S(D; \theta, \alpha) - \lambda H(\alpha) e^{-\frac{t}{\tau}}$$

wherein $\theta$ represents one or more parameters of the target network, $\alpha$ represents the architecture parameter vectors, H represents entropy operation, t represents the number of times of epochs, $\tau$ represents a reinforcement hyperparameter, $\lambda$ represents a scaling hyperparameter, $L_S$ (D; $\theta$, $\alpha$) represents one or more initial losses calculated by referring to the $$\lambda H(\alpha) e^{-\frac{t}{\tau}}$$

estimated search vector and the GT search vector, represents the diversity parameter, and L(D; $\theta$, $\alpha$) represents the architecture parameter losses.

3. The method of claim 1, wherein the optimized layer type set includes (1) at least one target layer to be used for performing at least one target operation according to a purpose of the target network and (2) a zeroise layer to be used for generating an output whose components are all zeros irrespective of its input,
   wherein a specific architecture parameter vector, corresponding to a specific neural block, among the architecture parameter vectors is generated by using an equation below, and $$\left[\frac{\alpha_z}{\gamma}, \alpha_{op_1}, \ldots, \alpha_{op_n}\right]$$

wherein $\alpha_z$ represents an initial probability of a zeroise operation, corresponding to the zeroise layer, being selected as a specific final layer operation, among the final layer operations, of the specific neural block, $\gamma$ represents a calibration hyperparameter to be used $$\frac{\alpha_z}{\gamma}$$

for calibrating the initial probability, represents a calibrated probability of the zeroise operation being selected as the specific final layer operation, and each of $\alpha_{op_1}$ to $\alpha_{op_n}$ represents each of probabilities of each of a first target operation to an n-th target operation corresponding to each of a first target layer to an n-th target layer being selected as the specific final layer operation.

4. The method of claim 1, wherein the optimized cell template is acquired by setting connections among the neural blocks as having a shape of a directed acyclic graph (DAG) and wherein the connections include intra-cell skip-connection and inter-cell skip connection.

5. The method of claim 1, wherein, at the step of (a), if the target data is inputted into the target network, the computing device performs a process of allowing a specific neural block among the neural blocks within a specific cell of the target network to apply each of the candidate layer operations, corresponding to each element in the optimized layer type set, to an input transmitted from its previous neural block among the neural blocks, to thereby transmit a result of the candidate layer operations to its next neural block among the neural blocks.

6. The method of claim 5, wherein, at the step of (a), the computing device performs a process of generating a weighted sum of the result of the candidate layer operations by referring to its specific architecture parameter vector among the architecture parameter vectors.

7. The method of claim 1, wherein the computing device performs a process of alternately inputting (1) a first target data to an n-th target data, one of which corresponds to the target data, in a target dataset and (2) a first temporary data to an n-th temporary data in a temporary dataset into the target network, to thereby alternately update (1) the architecture parameter vectors and (2) one or more temporary parameters to be used for performing each of the candidate layer operations of each of the neural blocks.

8. The method of claim 1, further comprising steps of:
(c) the computing device, if each of the final layer operations to be performed by each of the neural blocks is determined by referring to the architecture parameter vectors, performing a process of allowing the target network to apply the neural network operation to at least one training data, to thereby generate at least one estimated training vector; and
(d) the computing device performing a process of allowing the loss layer to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks.

9. A method of providing a user with a service for a purpose by referring to an estimated test vector generated using a target network, which is one of binary neural networks, created by performing neural architecture search (NAS) using optimized search space optimized for the binary neural networks, comprising steps of:
(a) a testing device, on condition that a learning device has performed, (1) if at least one target data is inputted into the target network, a process of allowing the target network to apply at least one neural network operation to the target data, to thereby generate at least one estimated search vector, (2) a process of allowing a loss layer to calculate one or more architecture parameter losses by referring to the estimated search vector and a GT (ground truth) search vector, and thus to perform backpropagation by referring to the architecture parameter losses, to thereby update one or more architecture parameter vectors to be used for determining each of final layer operations among candidate layer operations, wherein the candidate layer operations are included in an optimized layer type set corresponding to the optimized search space and wherein each of the final layer operations is to be performed by each of one or more neural blocks, within each of cells of the target network, arranged according to an optimized cell template corresponding to the optimized search space, (3) if each of the final layer operations to be performed by each of the neural blocks is determined by referring to the architecture parameter vectors, a process of allowing the target network to generate at least one estimated training vector by referring to at least one training data, and (4) a process of allowing the loss layer to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks, performing a process of allowing the target network to apply the neural network operation to at least one test data, to thereby generate at least one estimated test vector; and
(b) the testing device performing a process of providing a user with a service for the purpose by referring to the estimated test vector.

10. A computing device for generating a target network which is one of binary neural networks by performing neural architecture search (NAS) using optimized search space optimized for the binary neural networks, comprising:
at least one memory that stores instructions; and
at least one processor configured to execute the instructions to perform: (I) if at least one target data is inputted into the target network, a process of allowing the target network to apply at least one neural network operation to the target data, to thereby generate at least one estimated search vector, and (II) a process of allowing a loss layer to calculate one or more architecture parameter losses by referring to the estimated search vector and a GT (ground truth) search vector, and thus to perform backpropagation by referring to the architecture parameter losses, to thereby update one or more architecture parameter vectors to be used for determining each of final layer operations among candidate layer operations, wherein the candidate layer operations are included in an optimized layer type set corresponding to the optimized search space and wherein each of the final layer operations is to be performed by each of one or more neural blocks, within each of cells of the target network, arranged according to an optimized cell template corresponding to the optimized search space,
wherein, at the process of (II), the processor performs a process of generating the architecture parameter losses by referring to at least one diversity parameter, the estimated search vector, and the GT search vector.

11. The computing device of claim 10, wherein, at the process of (II), the processor performs a process of calculating the architecture parameter losses by using an equation below, and $$L(D; \theta, \alpha) = L_S(D; \theta, \alpha) - \lambda H(\alpha)e^{-\frac{t}{\tau}}$$

wherein θ represents one or more parameters of the target network, α represents the architecture parameter vectors, H represents entropy operation, t represents the number of times of epochs, τ represents a reinforcement hyperparameter, λ represents a scaling hyperparameter, $L_S$ (D; θ, α) represents one or more initial losses calculated by referring to the $$\lambda H(\alpha)e^{-\frac{t}{\tau}}$$

estimated search vector and the GT search vector, represents the diversity parameter, and L(D; θ, α) represents the architecture parameter losses.

12. The computing device of claim 10, wherein the optimized layer type set includes (1) at least one target layer to be used for performing at least one target operation according to a purpose of the target network and (2) a zeroise layer to be used for generating an output whose components are all zeros irrespective of its input,
wherein a specific architecture parameter vector, corresponding to a specific neural block, among the architecture parameter vectors is generated by using an equation below, and $$\left[\frac{\alpha_z}{\gamma}, \alpha_{op_1}, \ldots, \alpha_{op_n}\right]$$

wherein $\alpha_z$ represents an initial probability of a zeroise operation, corresponding to the zeroise layer, being selected as a specific final layer operation, among the final layer operations, of the specific neural block, γ represents a calibration hyperparameter to be used $$\frac{\alpha_z}{\gamma}$$

for calibrating the initial probability, represents a calibrated probability of the zeroise operation being selected as the specific final layer operation, and each of $\alpha_{op_1}$ to $\alpha_{op_n}$ represents each of probabilities of each of a first target operation to an n-th target operation corresponding to each of a first target layer to an n-th target layer being selected as the specific final layer operation.

13. The computing device of claim 10, wherein the optimized cell template is acquired by setting connections among the neural blocks as having a shape of a directed acyclic graph (DAG) and wherein the connections include intra-cell skip-connection and inter-cell skip connection.

14. The computing device of claim 10, wherein, at the process of (I), if the target data is inputted into the target network, the processor performs a process of allowing a specific neural block among the neural blocks within a specific cell of the target network to apply each of the candidate layer operations, corresponding to each element in the optimized layer type set, to an input transmitted from its previous neural block among the neural blocks, to thereby transmit a result of the candidate layer operations to its next neural block among the neural blocks.

15. The computing device of claim 14, wherein, at the process of (I), the processor performs a process of generating a weighted sum of the result of the candidate layer operations by referring to its specific architecture parameter vector among the architecture parameter vectors.

16. The computing device of claim 10, wherein the processor performs a process of alternately inputting (1) a first target data to an n-th target data, one of which corresponds to the target data, in a target dataset and (2) a first temporary data to an n-th temporary data in a temporary dataset into the target network, to thereby alternately update (1) the architecture parameter vectors and (2) one or more temporary parameters to be used for performing each of the candidate layer operations of each of the neural blocks.

17. The computing device of claim 10, wherein the processor further performs:
   (III) if each of the final layer operations to be performed by each of the neural blocks is determined by referring to the architecture parameter vectors, a process of allowing the target network to apply the neural network operation to at least one training data, to thereby generate at least one estimated training vector, and (IV) a process of allowing the loss layer to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks.

18. A device for providing a user with a service for a purpose by referring to an estimated test vector generated using a target network, which is one of binary neural networks, created by performing neural architecture search (NAS) using optimized search space optimized for the binary neural networks, comprising:
   at least one memory that stores instructions; and
   at least one processor configured to execute the instructions to perform: (I) on condition that a learning device has performed, (1) if at least one target data is inputted into the target network, a process of allowing the target network to apply at least one neural network operation to the target data, to thereby generate at least one estimated search vector, (2) a process of allowing a loss layer to calculate one or more architecture parameter losses by referring to the estimated search vector and a GT (ground truth) search vector, and thus to perform backpropagation by referring to the architecture parameter losses, to thereby update one or more architecture parameter vectors to be used for determining each of final layer operations among candidate layer operations, wherein the candidate layer operations are included in an optimized layer type set corresponding to the optimized search space and wherein each of the final layer operations is to be performed by each of one or more neural blocks, within each of cells of the target network, arranged according to an optimized cell template corresponding to the optimized search space, (3) if each of the final layer operations to be performed by each of the neural blocks is determined by referring to the architecture parameter vectors, a process of allowing the target network to generate at least one estimated training vector by referring to at least one training data, and (4) a process of allowing the loss layer to calculate one or more operation parameter losses by referring to the estimated training vector and a GT training vector and to perform backpropagation by referring to the operation parameter losses, to thereby learn at least part of one or more operation parameters to be used for performing each of the final layer operations of each of the neural blocks, a process of allowing the target network to apply the neural network operation to at least one test data, to thereby generate at least one estimated test vector, and (II) a process of providing a user with a service for the purpose by referring to the estimated test vector.

* * * * *